April 21, 1959 B. A. FERNANDEZ 2,883,458

PRIVATE COMMUNICATION

Filed Oct. 5, 1953 5 Sheets-Sheet 1

April 21, 1959 B. A. FERNÁNDEZ 2,883,458
PRIVATE COMMUNICATION
Filed Oct. 5, 1953 5 Sheets-Sheet 2
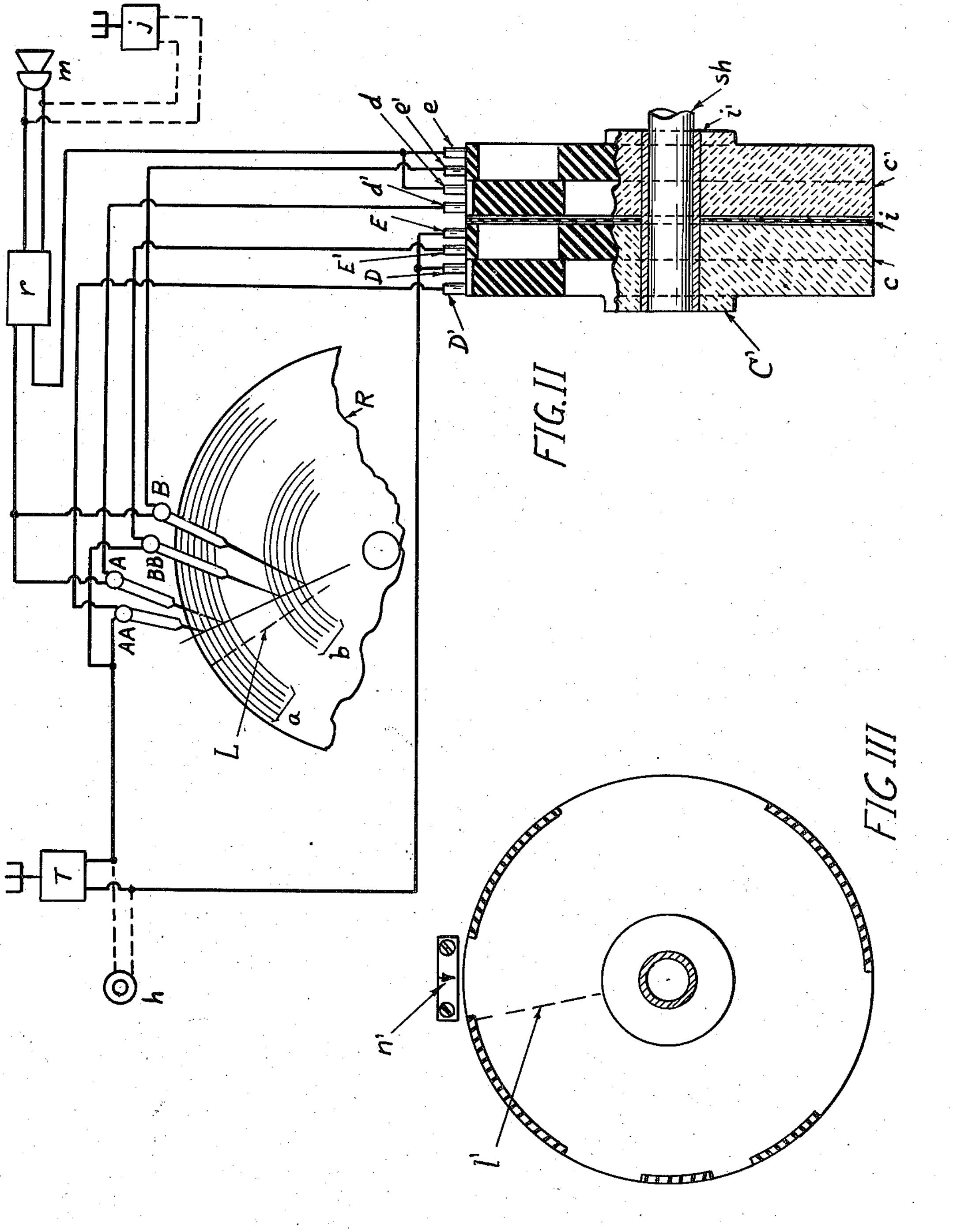
FIG. II, FIG III

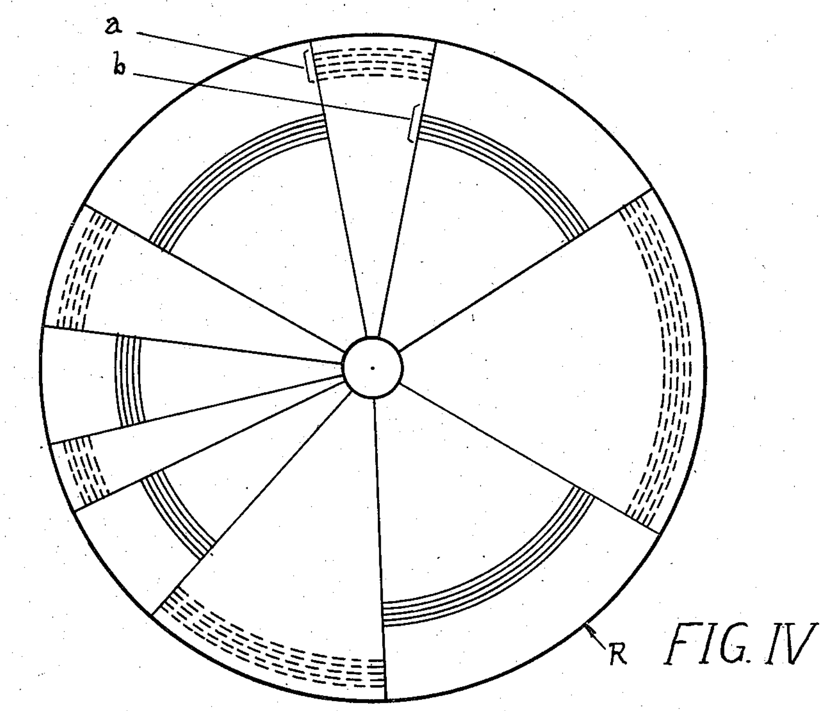
FIG. IV
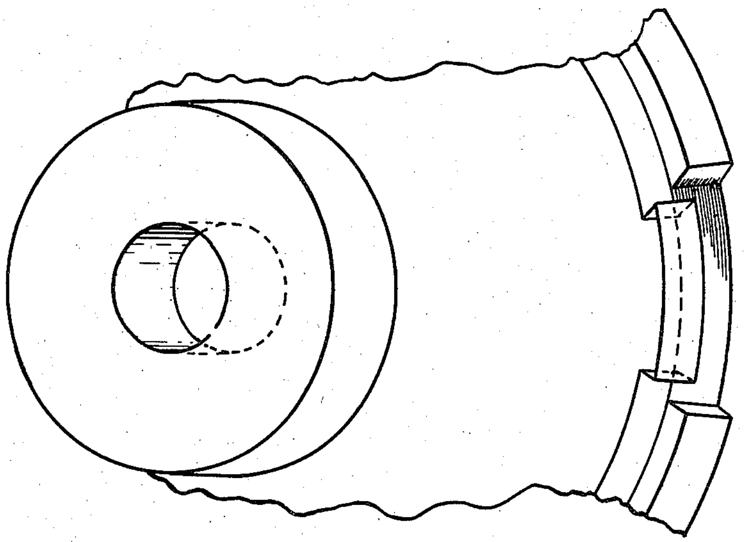
FIG. V

April 21, 1959 B. A. FERNÁNDEZ 2,883,458
PRIVATE COMMUNICATION
Filed Oct. 5, 1953 5 Sheets-Sheet 4
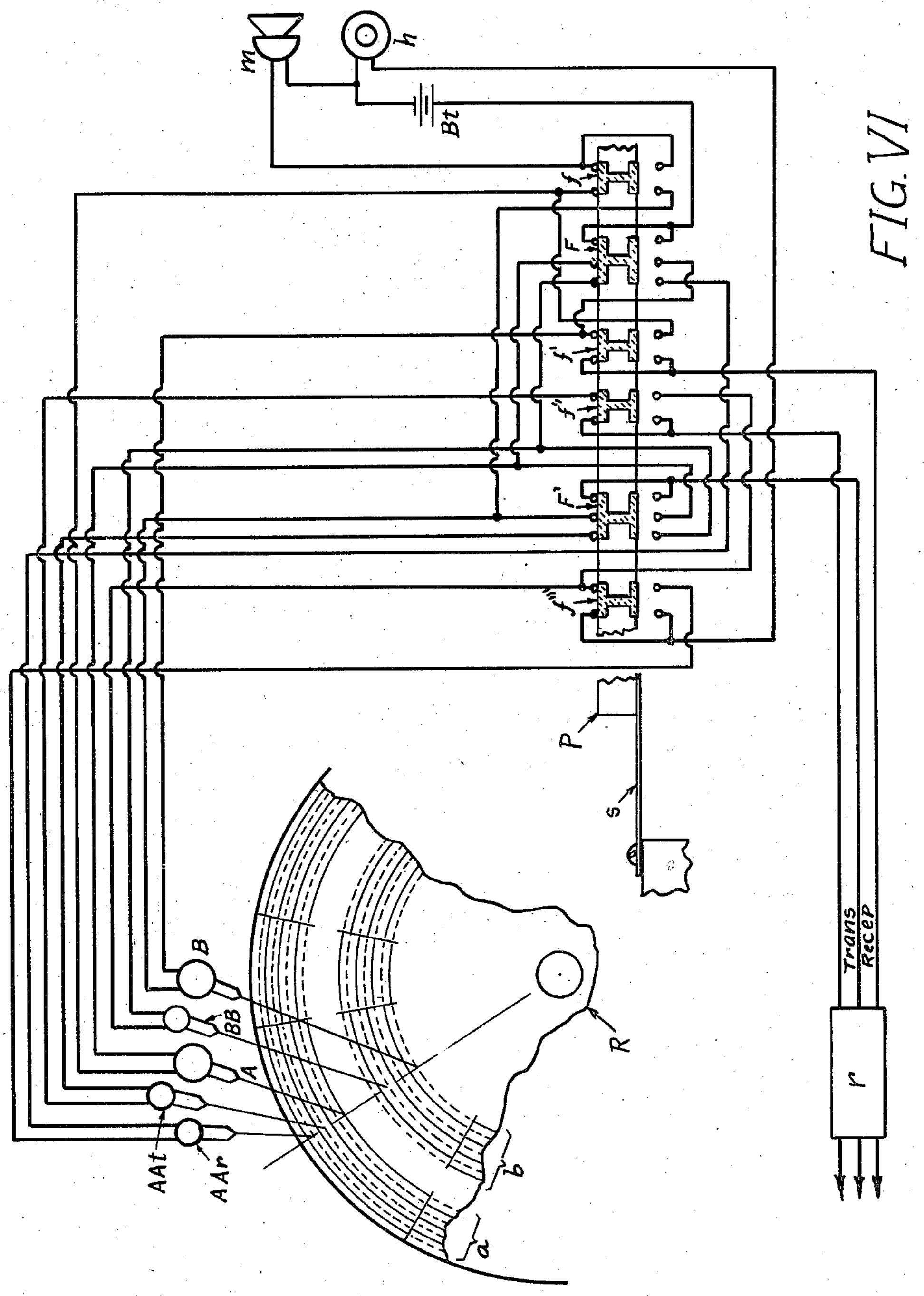
FIG. VI April 21, 1959 B. A. FERNANDEZ 2,883,458
PRIVATE COMMUNICATION
Filed Oct. 5, 1953 5 Sheets-Sheet 5
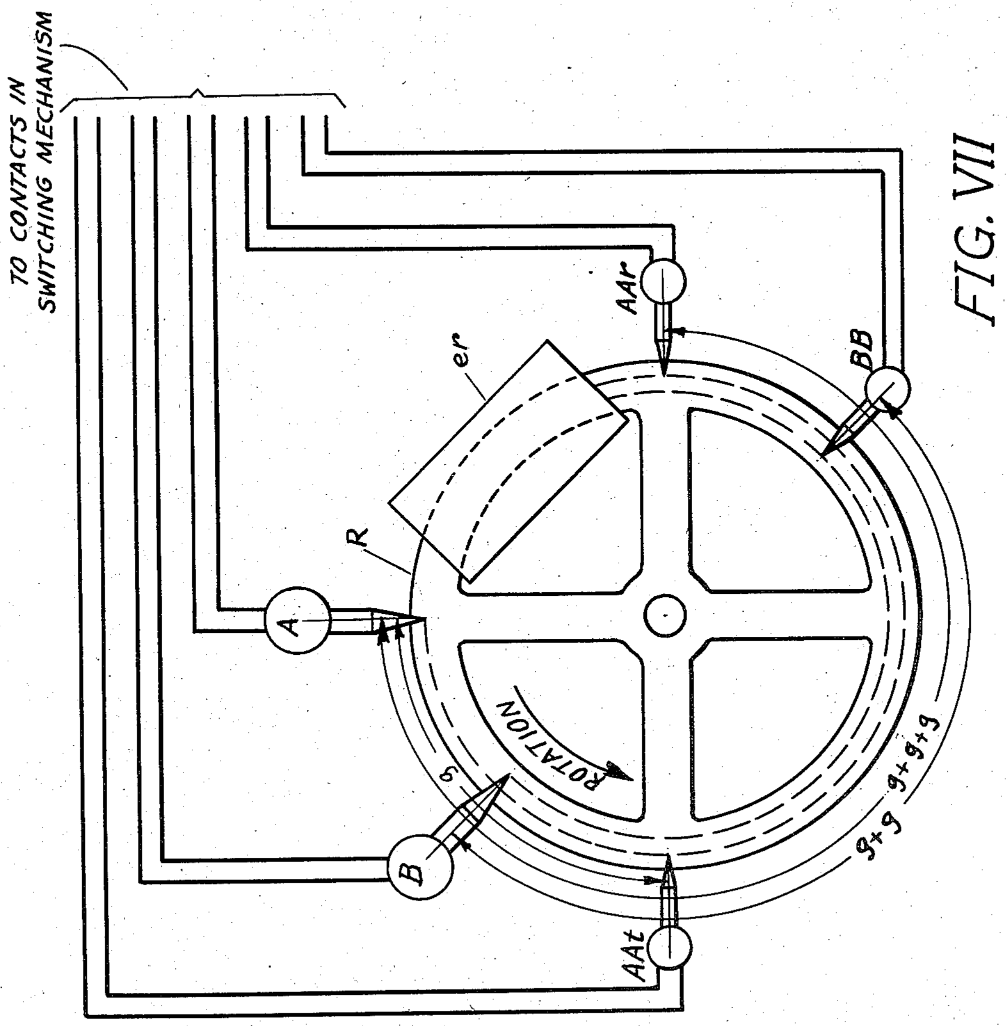
FIG. VII United States Patent Office 2,883,458
Patented Apr. 21, 1959

2,883,458

PRIVATE COMMUNICATION

Bernardino A. Fernández, Chicago, Ill.

Application October 5, 1953, Serial No. 384,045
5 Claims. (Cl. 179—1.5)

Figure 1:
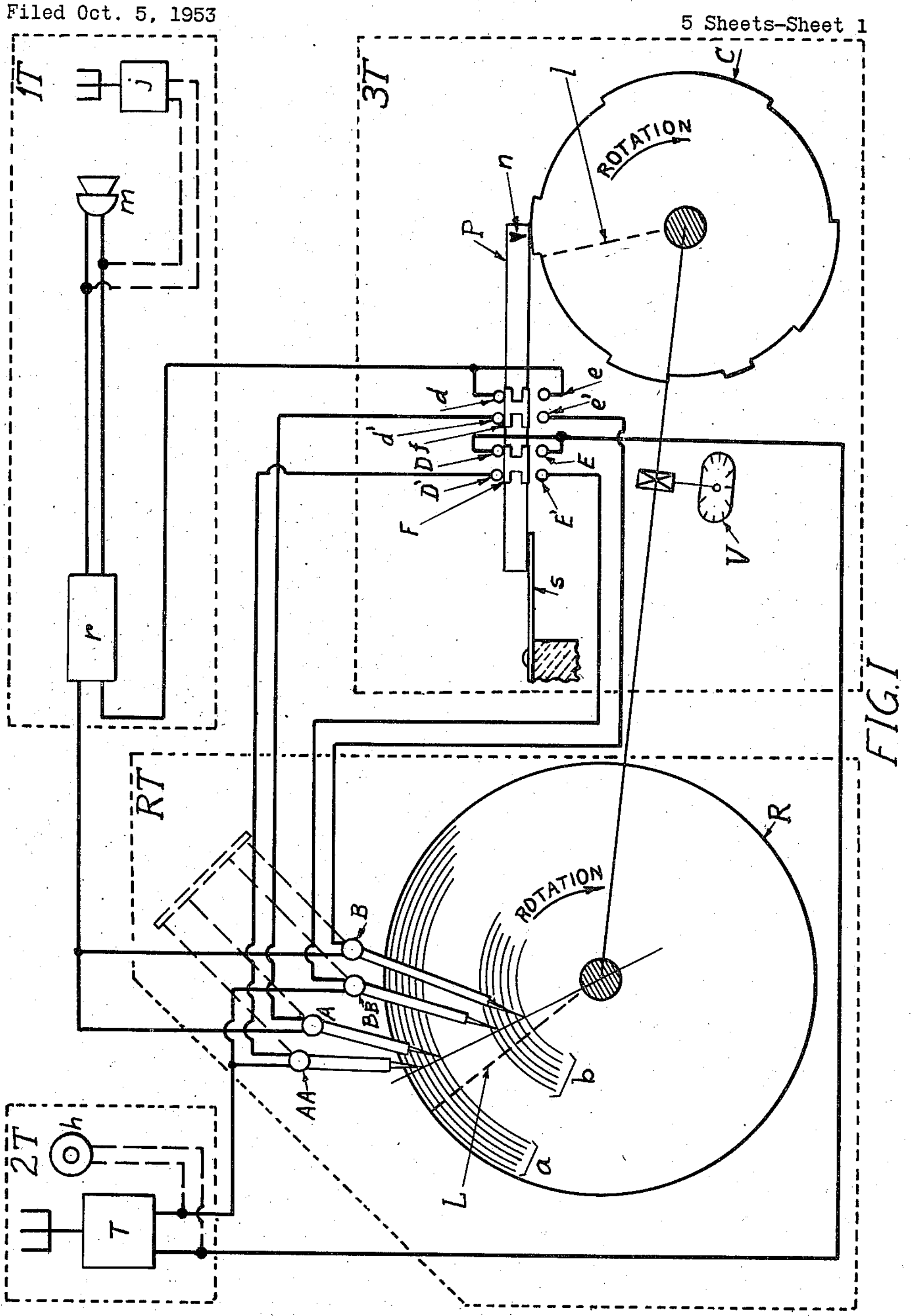

The present invention relates to a manner of radio and telephone communication which enables a transmitting station to send messages to a selected station, or even to a selected person, with the exclusion of others. In fact, my invention makes possible a person to person conversation through radio or telephone to be carried out with absolute secrecy.

My invention accomplishes this by making a duplex transcription of the signals to be transmitted previous to the transmission, and releasing said signals from the transcription in broken fractions. These fractions are disrupted from their position of consecutiveness and so mixed that the group of fractions as transmitted are actually incoherent signals. This fractioning and mixing is done through a device as explained elsewhere in this disclosure.

The receiving station, or the person, as the case might be, uses the same device in reverse to rearrange the signals to their original intelligibility.

The fractioning and mixing is directed by a cam or commutator which, as it rotates, causes a series of "On" and "Off" conditions to exist in circuits carrying the signals to a recording disc, or wire, or tape, as the case might be. From there the signals are played to the transmitting station, as explained elsewhere. These periods of "On" and "Off" are intentionally made of unequal values; that is to say, of unequal length or duration, grouped in a fixed sequence, according to the dents or segments of said commutator. As it will become evident in the course of this disclosure, only the individual possessing a commutator similar to that used in the pre-transmitting transcription may attempt successfully to listen to the transmitted message.

The transcription and the transmission are almost simultaneous: the signals, once pronounced, take 2 seconds or less to reach the ears of the listener.

All this will be made clear as I proceed to explain the arrangement by means of the following drawings:

Figure I represents a transmitting station which uses a phonograph system. It includes an input unit 1T, where the signals originate; an inscribing unit RT used to make a record and play-back the speech or signals intended for transmission; a transmitting set 2T, comprising a transmitter T; and a commutating mechanism 3T intended to switch the connections from one circuit to another, through the action of a rotating cam C, which is frequently alluded to as the commutator.

Figure II represents an optional method of commutating the connections. It can be a substitute for mechanism 3T of Fig. I. A rotating commutator C' effects the switching of the circuits, which in this case are connected to stationary brushes D, D', *d*, *d'* etc.

Figure III is a side view of the commutator C'.

Figure IV depicts the recording disc with 5 turns of effective recording; *a* and *b* represent recording lines cut by the recording heads A and B acting alternately.

Figure V illustrates part of the commutator's bare edge, showing its dents and depressions, before filling the same with insulating compound.

Figure VI illustrates the arrangement for a two-way conversation station. It transmits and receives at the same time, as a telephone station, and requires 2 recording heads A and B, and 3 pick-up heads BB, AA*t* and AA*r*.

Fig. VII illustrates a two-way phonographic arrangement, using a close-ring track for the recording and pick-up needles to act over and over.

The action is as follows:

In Fig. I the input unit 1T comprises the microphone *m* and the amplifier *r*. The signals, originated in the microphone *m*, are sent to the recording unit RT through the recording heads A and B while the disc is rotating. This produces in the disc a pair of recorded sections as depicted by the two bands *a* and *b*. AA and BB are pick-up heads. The needles of these four heads coincide in the same radial line.

Just a trifle behind head A, let us say about three turns of disc R, the pick-up head AA follows reproducing the signals as recorded by head A, and sending them to station 2T through contacts D, D', shunted by metallic piece F. Pick-up head BB is following head B at a distance equal to the distance between A and AA plus 360°, that is to say, at a distance of four turns of disc R. BB is reproducing the signals as recorded by B, and sending same to staiton 2T through contacts E, E' shunted by F. As stated before, 3T is the commutating device in charge of switching the connection of the amplifier *r* alternately from recording head A to recording head B, and from B to A again and again, in a rapid continuous manner, following a pattern governed by the dents and depressions of the commutator C.

From this explanation it can be understood that when the commutator C is rotating, the signals from 1T are reaching heads A and B in short dashes, which I call "alive" dashes, interrupted by empty spaces, which I call "blank" spaces.

The arrangement, as shown in Fig. I, and illustrated by Fig. IV, is such that the alive dash made by head A on section *a* of record R, corresponds to a blank space of the same duration left by head B on section *b*. Conversely, the blank space left by A, corresponds to an alive dash impressed by B. And since commutator C and recording disc R run synchronically, all the dashes produced by a certain dent, or a certain depression of the commutator, are perfectly aligned radially on the disc, forming a perfect sector, as depicted in Fig. IV. This circumstance affords the placing of the heads AA and BB on any position along the radial line of the heads without breaking the harmony of sequence of "record-dashes" versus sequence of commutator "On and Off" action. Thus the distance between B and BB, as stated above, is made one revolution of R longer than that between A and AA, in order to break the consecutiveness of the signals, and make them incoherent without impairing said harmony, the existence of which is essential to this arrangement.

It will be noticed that when head A is alive, with connection to amplifier *r* through circuit *d*—*f*—*d'*, head AA is also connected to station 2T through circuit *D*—*F*—*D'*. When the commutator brings about the transfer of connections from A to B, the pick-up head AA is also disconnected from 2T, thus avoiding the needle scratch noise to impair the transmission. The same applies to head BB when B is disconnected.

It is well to notice that any suitable type of commutation can be used, as for example that of the segmented commutator shown in Fig. II, and described elsewhere; or that of the cam system, the principle of which is shown by 3T, Fig. I. Referring to Fig. I, P is a rigid bar or strip held securely in one end to a base or stationary boss by spring *s*. This spring tends to keep the bar P down, making the metallic piece F to shunt contacts E—E', and piece $f$ to shunt contacts $e$—$e'$. The shunting pieces F and $f$ are electrically insulated from the bar and from each other. Contacts D and E are permanently shunted, and connected to station 2T, while contacts $d$ and $e$, also permanently shunted, are connected to amplifier $r$.

As the bar P moves up and down, guided by the dents and depressions of commutator C, the amplifier $r$ is alternately connected to heads A and B, as stated above, thus inscribing fractions of the signals on disc R.

The speed of C is very well controlled, as it is effected by the same motor operating the recording disc R. This motor is not shown. It can be a synchronous motor with speed reducer, or any suitable device capable of imparting a constant speed to commutator C, say of one turn per second, or so.

As it can be noticed, the fraction of signal sent by BB at a given moment is not that which coherently follows that sent by AA, since one and the other are separated by a considerable distance, in this case being a distance of 360°, or one full turn of disc R, which is also a full turn of commutator C, as agreed. Thus, the fractions of the signals consecutively reaching the station 2T from AA and BB are not consecutive in the speech, but rather form an incoherent chain of confused sounds.

The above arrangement can serve as a receiver by substituting for the transmitter T an earphone $h$, and replacing the microphone $m$ by the radio-receiver $j$. Both are shown in Fig. I with connections in dotted lines. Such is the arrangement used at the receiving station to record the incoherent chain of signals as coming from the transmitting station, and to rearrange same to their original sequence and intelligibility, so they become understandable. The remaining elements, as shown in Fig. I, have, when receiving, the same function as previously described: To repeat: $j$ is an ordinary radio-receiver which reproduces the confused chain of signals just as it is radiated by the transmitting station. The sensitized disc or record R will receive a double transcription of the incoherent signals as they are received. The recording heads A and B are in charge of impressing said incoherent signals on disc R. The relative position of the pick-up head AA is different when the machine is used for reception. When receiving, the span between A and AA is 360° larger than the span between B and BB. On the transmitting machine, however, the span between A and AA is 360° shorter than the span between B and BB, as stated before.

The arrangement is such that a two-wire connection can be plugged into both 1T and 2T. When transmitting, 1T will take a microphone, while 2T will take a radio-transmitter or telephone transmitting line, according to the kind of medium used. When receiving, 1T will take an ordinary radio-receiver or the incoming telephone wires, while 2T will take earphones.

All the phonograph heads are rigidly linked together as shown by straight dotted lines, in order to insure their mutual relative position. A thumbscrew mechanism, not shown, moves the pick-up head AA to the proper position for receiving or for transmitting.

When receiving, the chain of scrambled fractions of signals is inscribed in two sections of disc R, as depicted by the two shaded bands $a$ and $b$. As head AA and BB pick-up the fractions of signals to take them to earphone $h$, these fractions are rearranged at contacts D—D', $d$—$d'$ and E—E', $e$—$e'$ by the On and Off action of the commutator C, thus bringing them to their original intelligibility before they reach the earphone $h$, as previously stated. In this instance it is assumed that the commutator C is presently in the equipment of the receiving station during the reception of the signals. It is also assumed that the commutator C of the receiving station is synchronized both in speed and in angular position, with C of the transmitting station.

The above mentioned synchronization may be accomplished in several ways, one of them being a procedure as follows: After the transmitting station alerts the receiving station with messages by direct medium, it starts to give a series of synchronizing signals, consisting of bell's tinks, or clock's ticks, coinciding with its commutator C (Fig. I) reaching a certain position in its rotation. I call this the "starting position," and it occurs when the "starting line" $l$ faces the "stationary arrow" $n$ (Fig. I). The mechanism is arranged so that the "starting line" L of disc R is under the needles of A, AA, B and BB when the "starting position" occurs. The position of said "starting line" can be located anywhere on the circumference of C, but its counterpart at the receiving station must have said line marked in the same position; that is to say, both cams must be identical in this respect too.

The synchronization signals from the transmitting station are sent directly through the medium used, be it radio or telephone, while the mechanism rotates with "needles off," that is to say, with the needles of A, AA, B and BB lifted off the disc C by a mechanical arrangement not shown. A similar procedure is followed at the receiving station, which on being alerted, starts its mechanism, and using the "speed modifier" V (Fig. I) slows down or speeds up the rotation of C until such synchronization is obtained. Said synchronization is obtained when the ticks from the transmitting station coincide and stay in pace with similar ticks produced by the mechanism at the receiving station. An established period of 3 or 5 minutes for synchronization may be agreed among stations when using the one-way communication system; but it is not necessary when using the two-way system described elsewhere in this disclosure.

If commutator C is not present in the mechanism of the receiving station during the actual reception, the recording can still be effected, and the record played any time after by the person who has the key commutator identical to C. The synchronization procedure follows the same pattern as described, since in the mechanism illustrated in Fig. I the starting line L of disc R, is the same position of the rotation as the starting position of C, as previously agreed. So, this circumstance applies equally to the transmitting as well to the receiving station. In fact, this means that the mechanism in each of the stations is arranged to sound a Tick at a given position on each revolution. The disc R and the commutator C must be placed in such a position as to correspond said ticks with their starting line facing the previously indicated points, during their rotation. This is easily done by having a properly located mark on the turntable to which the starting line must accurately correspond in placing the disk R and the cam C in any of the stations. It can be understood by the above explanation, that the presence of the commutator C at the receiving station is not essential either for synchronization or for the correct reception and recording of the message when using this one-way communication system. It is obvious that in order to play back the receiving record R some time latter, it will suffice to place the commutator C in the "starting position" while the receiving disc R has its "starting line" L under the needles. The speed of the mechanism in such cases does not have to be exactly the same as that in which it was recorded.

In regard to speed modifier V in Fig. I, it is pertinent to state that it can be of any suitable type; thus, I consider it unnecessary to describe here any special type, or its functioning.

Fig. II shows the principle of the segmented commutator and the manner in which it shall be connected to replace the bar P and the cam C of Fig. I. The commutator itself is shown by C'. The body is formed of two solid discs $c$ and $c'$, made of copper, phosphor bronze, or the like, assembled rigidly together and insulated one from the other by an insulating sheet $i$. The periphery of each disc is half covered by an insulating layer as depicted by the heavily shaded portions. Fig. V illustrates some of the dents and corresponding depressions on the edge of said discs. In this picture, which represents one disc before assemblage, the depressions are shown devoid of the insulating matter for clarity's sake. Fig. III is a side view of the commutator C', showing the "starting line" *l'* and the "stationary arrow" *n'*. The portions of the periphery not covered by insulation are polished to afford good electrical contact with carbon brushes *e*, *e'*, *d*, *d'*, *E*, *E'*, *D* and *D'*. All these brushes are properly mounted on stationary brushholders, having spring pressure, and being insulated from ground, as those found in electric motors. None of these details are shown in the drawings.

The surface of the periphery of disc *c*, as well as that of *c'*, is divided in two equal sections: one for each pair of brushes to slide on; those of *c* for brushes D, D' and E, E'; and those of *c'* for brushes *d*, *d'* and *e*, *e'*. Each polished portion of one of the sections corresponds to an insulated portion of the other, and vice versa. The commutator is rotated by shaft *sh*, which is insulated from the commutator's body by the insulating sleeve *i'* and properly mounted in a stationary support, not shown.

The rest of the picture is the same as that in Fig. I. The functioning is also practically the same. As the commutator C' turns, the On and Off action is accomplished by its shunting and non-shunting action on each pair of brushes as they come in contact with polished or insulated segments. As it can be observed, the shunting of brushes D, D' is simultaneous with that of *d*, *d'*; and the alternate shunting of E, E' is simultaneous with that of *e*, *e'*. The segments are made of unequal angular values, disposed in a special but arbitrarily chosen sequence, to cause the fractioning of the signals. These fractions are then scrambled by the playing heads through the commuting action of C', the result of which is a chain of incoherent signals that no one can understand, except when rearranged by a commutator of the same design. What has been said regarding the results obtained with a movable bar P actuated by a cam C (Fig. I) applies identically to the use of a rotating commutator C' (Fig. II) as described.

Figure VI shows the arrangement used for a two-way conversation station. A phonograph recording means is being used again; but a tape or wire recording system can be adapted to accomplish the same results. As in the telephone, this machine serves for a simultaneous transmitting and receiving operation. The arrangement is such that the "blank" spaces left on the disc R in the recording of the transmitted signals, are used for recording the received signals. This is accomplished by transferring the connections of the recording heads A and B from the transmitting circuit to the receiving one, and vice versa, after each "alive" dash has been completed. The pick-up head BB is also transferred from one circuit to the other. But the pick-up heads AA*t* and AA*r* are only connected and disconnected to play counterpart to BB in its function of reproducing the signals recorded by B: AA*t* matches BB in its function of reproducing the transmission signals, and AA*r* matches BB in its function of reproducing the reception signals. The distance between AA*t* and A is 360° shorter than that between B and BB; while the distance between AA*r* and A, on the contrary, is 360° longer.

The cam action is the same as previously described, and since the disconnection and transferring of all these heads are effected by the movement of the same rigid bar P, the beginning of each action is properly timed with the ending of the previous one. The connections, as shown in Fig. VI, are carefully made so as to obtain a proper functioning. In this picture the bar P is shown in the Up position, hence the recording head A is connected to microphone *m*, recording on disc R for transmission, while B is connected to amplifier *r*, recording for reception. BB is connected through the battery B*t* to earphone *h*, picking-up for reception, while AA*t* is connected to the transmission circuit, playing counterpart to BB, that is picking-up for transmission. AA*r* is idle during this period. When the bar goes down, recording head B is connected to microphone *m*, recording for transmission, while A is connected to amplifier *r*, recording for reception. BB is connected to the transmission circuit, picking-up for transmission, while AA*r* is connected through the battery B*t* to earphone *h*, picking-up for reception. AA*t* is idle during this period. As the bar P moves up and down these actions are repeated accurately, as previously explained.

The synchronization process is easier in this instance, because both parties are equally aware of the stage and condition of said synchronization, and since the signals start to be intelligible as soon as synchronization is near enough to perfection, both parties can repeat, ask questions, or wait until the signals become clear.

It is obvious that any recording medium may be used where a linear medium such as a magnetic tape or wire is used, the various means are spaced along the path of medium travel so that the mediums advance from head A to head AA*t* during One turn of commutator C; that is to say, at a linear distance equivalent to 360° rotation of C. In the previous arrangements I have to deal with the spiral-shaped groove of the ordinary phonograph record, and on account of the dimensions of the heads, I have been forced to place AA (Fig. I) 3 turns away from A, making much longer the time for a given signal to reach the ear of the listener. When said distance is equivalent to only one turn, a given signal reaches the listener's ear just after 4 turns of the commutator C. Making C rotate at 120 r.p.m., such space of time is 2 seconds, as stated above.

In the arrangement illustrated by Fig. VII, the disc R' offers a continuous, circular, close-ring type trail for heads A, AA*t* and AA*r*; and another for B and BB. The distance *g* between A and AA*t* is equal to the motion of R' during one turn of the commutator C, since the mechanism is arranged so that R' turns once for every 4 turns of C. The arrow indicates the direction of motion. The eraser is shown by *er'*. Mechanical convenience might insinuate the use of a cylinder instead of disc R'. The arrangement will look much the same as Fig. VII, so I consider it unnecessary to illustrate that with another picture.

In order to fully appreciate the merits of my invention it is well to note the following:

The dentation or segmentation of either cam or commutator, being intentionally made of varied angular sizes, lends itself to a limitless variety of designs, in which the number of dents, their dimensions and the position in the sequence, can vary almost without limit, and can be chosen arbitrarily. The cam type is relatively inexpensive, and even can be made in a few minutes from a commercialized blank, by a person without great mechanical skill, and with little effort. It can be removed and replaced by a different one almost as easily as a phonograph record. The same cam will perform entirely different by either changing the direction of rotation, or the face looking up. Since this commuting element is the key to the intelligent reception of the signals transmitted by the special arrangement shown, it is obvious that only the individual possessing that particular commuting key is able to receive intelligible signals. Any intruder trying to listen in will only receive a confused chain of broken signals. Parties interested in secrecy can change their key as often as they consider safe, even during a conversation. They can have a collection of different keys at hand for an insignificant cost. The study of new codes or the need of expert deciferers is not necessary.

The functioning of the one-way station is explained and clarified by the following example:

The commander of a fleet wishes to communicate a secret message to the captain of one of the ships which are equipped with this machine. The ship and the person are alerted by ordinary radio. The commander announces "Captain X, 0–12–W–5," meaning that Captain X is called for private talk, using key 0–12, clockwise direction of rotation, starting 5 minutes later. The code 0–12–W–5 may have a specific meaning only to Captain X, who may possess a dozen or a hundred different keys. This key or commutator itself is a flat piece, 3 or 5 inches in diameter, weighing from 3 to 6 ounces, which the called person can carry in his pocket. When answering a call, he inserts this key in the place arranged for it in the equipment, in such an angular position as indicated by certain marks in said key, which must match certain stationary marks in the equipment; or a hole properly located on the key, to correspond to a pin on the turntable of said key. Captain X then starts the rotation of the equipment and begins the process of synchronization. With the earphones on, he is ready to listen as the message comes in. Otherwise, in an organized station a regular operator may accomplish the synchronization using a monitor, while Captain X listens and waits. For the sake of secrecy, the operator shall relinquish his monitor as soon as the synchronization is accomplished. If Captain X is not immediately available, the message can be recorded on disc R of the receiving station, and played back later on at Captain X's convenience.

In the case of the two-way conversation machine, the two parties can start a conversation by direct medium, and at an agreed moment put the machines in series with the medium's equipment to talk privately. This can be done easily by providing a proper circuit with a double throw switch. Such a circuit, frequently used, will keep the communication medium connected for direct communication, and can be cut off at will for talk through the privacy machine, which will be automatically connected with the throw of the switch.

I am aware that privacy in speech transmission has been previously attempted, especially by the Speech Scrambling method described by William W. Roberts in Electronic Manual for Radio Engineers, pages 815 to 820, and called "Complete Data on Frequency Inverter Circuits." I am also aware of the Speech Scrambler arrangement discussed by S. J. Begun in his book Magnetic Recording, page 187, copy-righted by Murray Hill Books, Incorporated, of New York; and of the Chesnut's System of Secret Signaling, U.S. Patent 1,829,783 dealing with radio frequency bands transposition. I am also aware of other attempts to obtain privacy in speech transmission using a pre-transmission recording arrangement, which breaks the signals in fractions of equal size, and scrambles them before transmission. I refer to Smith's Crytographic Communication System, U.S. Patent 2,401,888, granted on June 11, 1946. Said fractions, called "blocks" by the inventor, are of necessity, equal in time-dimension; they must be recorded and picked-up once, then recorded and picked-up a second time in order to have them conditioned for delivery to the transmitting medium. Even in theory this is a very elaborate process in comparison to that of my invention; and in practice will require a bulky equipment and a large number of parts, some of them relatively expensive and demanding a complicated and asiduous maintenance. I point especially to the use of a rotary switch and stepping mechanism for same, two erasers, a great number of recording heads, equal number of pick-up heads, and also equal number of amplifiers. I am aware also of the use of cams in the Chesnut's Method of Secret Signaling, U.S. Patent 1,829,783, and of the presence of a cam in the Smith's crytographic system above mentioned. Smith uses the cam for the purpose of energizing from time to time the stepping mechanism for wipers of the rotary switch, thus changing the sequency of the scrambling. Chesnut uses the cams similarly: to change the scrambling position of the bands.

There is no band scrambling, or changing of sequency in my invention; thus it eliminates the need for a bulky and complicated equipment, and rids both the manufacture and the operation of it, of a great deal of difficulties. My invention uses a cam, but it is obviously for a different purpose and function as used by the inventors mentioned above. I am aware also of the two phonograph arrangement used by Bascom's Privacy Testing System, U.S. Patent 2,153,706, granted April 11, 1939. But Bascom's system requires a bulky and complicated equipment, as he himself states in lines 25 to 28 of his disclosure, it operates on a completely different principle from that of my invention; and, of course, the performance of Bascom's testing system is limited to testing the Chesnut's system of secret signaling, above mentioned, and in no way provides station-to-station communication facilities.

The existing secret communication systems attempt to provide only One Way at a Time communication: the two stations involved have to undergo a change, which absorbs a considerable amount of time, to reverse their condition as transmitter or receiver. This is particularly true of the Chestnut's system above mentioned. Consequently, the existing systems require the transmitting station to stop, in order to allow the other station the right of way for answering or transmitting.

My invention, however, provides a genuine Two-Way communication system, by which a conversation between two parties can be held in a fashion identical to the present telephone system: i.e., the two parties can speak at the same time; either party or both can be a group of individuals, each one listening in his own private station, or speaking therefrom. And all this is done by means of a relatively simple and effective device, which operates without the complication of radio components, and containing relatively few and inexpensive parts, and being of relatively simple operation and maintenance, taking a space little more than a telephone coin box.

Having thus disclosed the parts and devices required in my invention, their combination and functioning, and the ways and means necessary to accomplish the purpose of said invention, I put forth my claims as follows:

1. A private communication system based on scrambling outgoing signals and unscrambling incoming signals comprising signal carrying means, means recording said signals, means sensing said recording signals at a predetermined fixed time interval following recording, commutation means alternately sensing said signals and alternately selecting said sensed signals according to a predetermined cycle and transmission and receiving means connected to said commutation means to transmit and receive the signals therefrom, and all of said means operating to substantially simtlaneously scramble said outgoing signals and unscramble said incoming signals in said predetermined cycle.

2. A private communication system as in claim 1 and wherein said recording and sensing means comprises a plurality of recording and sensing heads.

3. A private communication system as in claim 1 and wherein said commutation means includes a rotating cam member; whereby the predetermined cycle is determined by the configuration of said cam member.

4. A private communication system as in claim 1 and wherein said recording means includes a pair of recording heads, and said sensing means includes a trio of sensing heads.

5. A private communication system as in claim 1 and wherein said recording means includes a flat circular recording disc.

References Cited in the file of this patent

UNITED STATES PATENTS

| | | |
|---|---|---|
| 2,153,706 | Bascom | Apr. 11, 1939 |
| 2,401,888 | Smith | June 11, 1946 |